March 15, 1938.  E. H. VEDDER  2,111,013
RESISTANCE WELDING CURRENT CONTROL
Filed Feb. 7, 1934    3 Sheets-Sheet 1

WITNESSES:
E. A. McCloskey
R R Lockwood

INVENTOR
Edwin H. Vedder.
BY
ATTORNEY

March 15, 1938. E. H. VEDDER 2,111,013
RESISTANCE WELDING CURRENT CONTROL
Filed Feb. 7, 1934 3 Sheets-Sheet 2

INVENTOR
Edwin H. Vedder.
BY
ATTORNEY

Patented Mar. 15, 1938

2,111,013

UNITED STATES PATENT OFFICE 2,111,013

RESISTANCE WELDING CURRENT CONTROL

Edwin H. Vedder, Swissvale, Pa., assignor to Westinghouse Electric & Manufacturing Company, East Pittsburgh, Pa., a corporation of Pennsylvania Application February 7, 1934, Serial No. 710,095

41 Claims. (Cl. 250—41.5)

My invention relates, generally, to electric welding and it has particular relation to resistance welding of either the line or spot welding type.

In a system for controlling the flow of alternating current to a resistance welding circuit, it is desirable to provide an inertialess means for satisfactorily effecting the control of the current flow. Such means is desirable in order to provide an efficient, economical and accurate means whereby the alternating current supplied to the resistance welding circuit may be adjusted to the desired values and maintained for predetermined time intervals with an unvarying degree of accuracy over a long period of operation.

In the past, switches of various types have been used for controlling the current flow to a resistance welding circuit, all of which have been open to the objection that a certain amount of sparking or arcing occurs when the control circuit is completed or broken. The sparking or arcing is undesirable principally for the reason that it causes increased wear on the contact members and results in materially decreasing their life as well as the accuracy with which the control is effected. Further, the arcing may cause an explosion in the event that an explosive gaseous atmosphere exists in the vicinity of the contact members.

It is well known that it is highly desirable to provide a very accurate timing of the duration of the current flow in a resistance welding circuit, as well as to control the instant of time when the current is applied, in order to prevent burning of the material or to provide sufficient current to perform the welding operation and to prevent surges in the power system supplying current to the welding circuit. If the current is applied for too long a time, particularly on relatively thin materials, they are likely to be burned or destroyed. If sufficient current is not applied a poor weld ordinarily results. If the current is not applied at the proper instant in the current cycle, transient effects will be present, as is well known, due to the magnetic characteristics of the transformers which are connected to the welding circuit.

The object of my invention, generally stated, is to provide a control system for resistance welding apparatus or apparatus requiring similar operating current which shall be simple and efficient in operation, and which may be readily and economically manufactured and installed.

The principal object of my invention is to provide for accurately controlling the instant of application and duration of application of alternating current flow in a circuit such as a welding circuit.

Another important object of my invention is to provide inertialess and sparkless means for controlling the current flow in a resistance welding circuit.

Another object of my invention is to provide for applying the welding current at the zero point of the current wave.

Still another object of my invention is to provide for changing the average value of the welding current and thereby the welding heat by changing the time during which current is conducted during each half cycle.

A further object of my invention is to provide for adjusting the welding system according to the power factor of the welding circuit and for shifting a scale to correspond to the power factor of the circuit for indicating the required settings to provide different welding heats.

Other objects of my invention will, in part, be obvious and, in part, appear hereinafter.

My invention accordingly is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which.

Figures 1, 3:
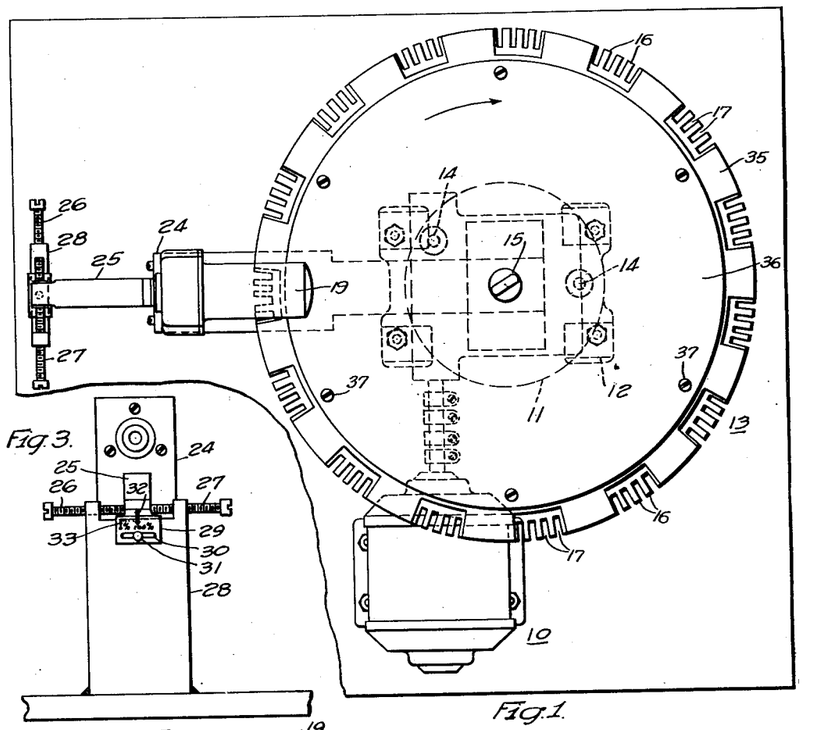
Figure 1 is a top plan view of a timer which may be used in practicing my invention.
Fig. 3 is a view, in end elevation, of a portion of the timer shown in Fig. 1, showing an adjustable scale which may be used for setting the timer.
Figure 2:
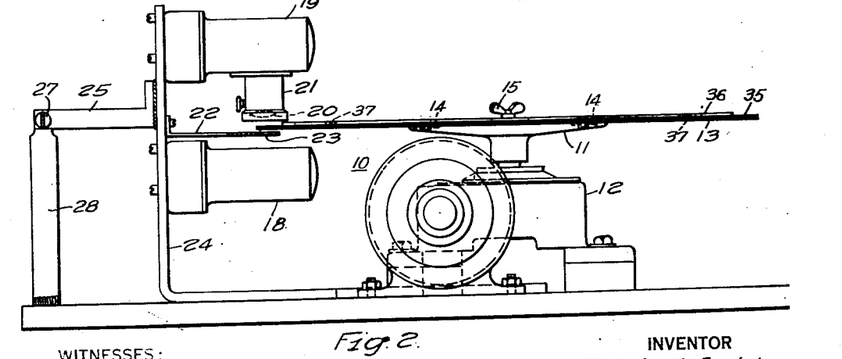
Fig. 2 is a view, in side elevation, of the timer shown in Fig. 1.

Referring now particularly to Figs. 1 and 2 of the drawings, the reference character 10 designates, generally, a synchronous motor which is arranged to drive a rotatably-mounted plate 11 through a set of reduction gears (not shown) which may be contained within a housing 12. The synchronous motor 10 is disposed to rotate the plate 11 through the reduction gears at such a rate that the plate 11 will be rotated once each second, or sixty times a minute.

A main disc 13 is mounted on the plate 11 and is fixedly positioned thereon by means of dowel pins 14 and a thumb nut 15. It will be understood that the dowel pins 14 are fixedly mounted on the plate 11 and that they extend into suitable apertures in the main disc 13.

Figures 4, 5, 6:
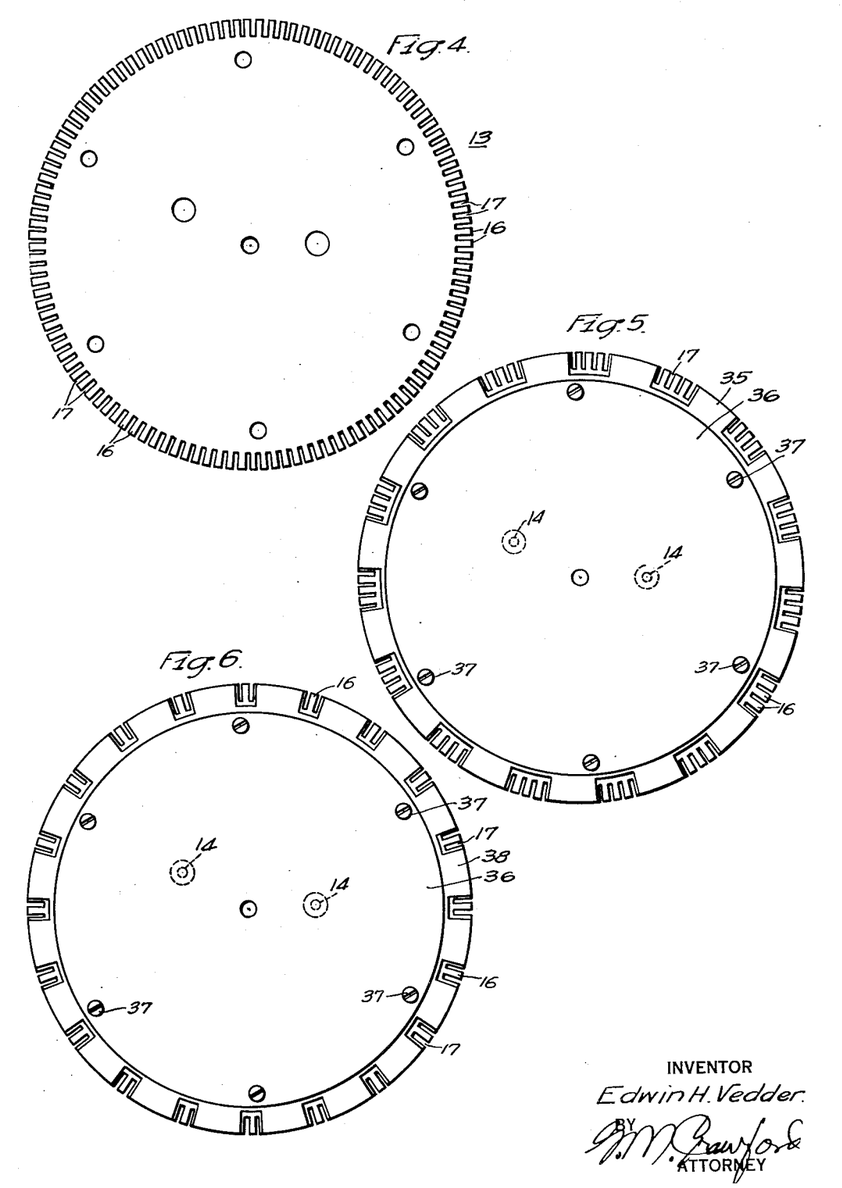
Fig. 4 is a detail plan view of the timer disc.
Figs. 5 and 6 are detail plan views showing the assembly of the timer disc with different blanking discs.

The periphery of the main disc 13, as is more clearly shown in Fig. 4 of the drawings, is provided with a plurality of teeth 16 and slots 17. In this instance the main disc 13 is provided with 120 teeth 16 and slots 17. Thus, when the plate 11 is rotated at the speed of one revolution per second, 120 teeth 16 or slots 17 will pass each second a stationary point located near the periphery of the main disc 13, or, in point of time, there will be one tooth 16 or one slot 17 per half-cycle, if a sixty-cycle current source is used.

When a sixty-cycle power system is used for operating the welding system with which this apparatus may be employed, it will be apparent that each of the teeth 16 or slots 17 corresponds to one-half cycle of the alternating current in point of time. It will be readily apparent, however, that other speeds of rotation of the main disc 13 may be employed as well as other teeth and slot combinations in the periphery thereof without departing from the scope of my invention. It will also be apparent that other types of openings may be provided in the disc 13 such as circular or rectangular apertures positioned at the desired spaced intervals.

A photo-electric cell 18 is provided underneath the main disc 13 and above it is positioned a light source 19 provided with a lens 20, located in a lens housing 21. The lens 20 is provided for focusing the rays of the light source 19 on the photo-electric cell 18. An arm 22, provided with an operture 23, is positioned to more sharply define the rays of light as they are applied to the photo-electric cell 18. It will be observed that the rays of light from the light source 19 will be intercepted by the teeth 16 of the main disc 13 and that the rays of light will be permitted to impinge upon the photo-electric cell 18 when any of the slots 17 are positioned therebetween.

It is desirable to position the lens 20 with respect to the main disc 13 so that its focal point is located in the plane of the main disc 13. With this arrangement any tendency of the main disc 13 to be distorted from its stationary horizontal position during rotation will not materially affect the instant that the light rays are applied to the photo-electric cell 18, as the teeth 16 intercept the light rays.

In the event that rays of light are arranged in the form of a cone, the apex of which is below the disc 13, there may be some variation in the timing due to distortion of the disc 13. This variation would be caused by the teeth 16 uncovering the light rays at different points along the surface of the cone. This effect may be obviated by tilting the photo-electric cell 18 and the light source 19, together with the associated parts, to such a degree that the trailing edges of the teeth 16 will be parallel to the surface of the cone of light rays on the side where they are first uncovered.

As illustrated in the drawings, the photo-electric cell 18 and the light source 19 are mounted on a bracket 24 which is positioned to rotate around the vertical axis of the plate 11 and main disc 13. In order to alter the time of application of the light rays to the photo-electric cell 18, corresponding to various points on the voltage or current wave, the bracket 24 may be rotated slightly to effect the desired timing. An arm 25, secured to the bracket 24, is positioned between a pair of adjusting screws 26 and 27 which are threadably mounted in a frame 28. It will be understood that the position of the arm 25, and thereby the position of the bracket 24, may be altered by turning the adjusting screws 26 and 27 in the proper direction to effect the desired change in the timing. It will also be understood that the timing may be adjusted by rotating the frame of the motor 10 instead of moving the bracket 24 and the apparatus carried thereby.

In view of the fact that the power factor of the welding circuit may be different for different materials, the position of the arm 25 will be different for the different power factors when the maximum heating is applied to the welding circuit. In order to provide for indicating the adjustment for different heating values for the different power factors an adjustable scale 29 may be used which is slidable on the frame 28. As illustrated, the scale 29 is provided with a slotted opening 30 with which a thumb screw 31 is arranged to engage and secure the scale 29 in any desired position. The arm 25 may be provided with a pointer 32 and the scale 29 may be provided with graduations 33 to which the pointer 32 may be adjusted to provide corresponding degrees of welding heat with reference to the maximum heat which is available.

In the event that the main disc 13 only is employed, the alternating current will be supplied to the welding circuit during each succeeding half-cycle. While such operation may be desirable under certain circumstances, it is more often the case that it is desired to apply the welding current for a predetermined number of half-cycles and, then, to prevent the application of welding current for a predetermined number of half-cycles which may or may not be the same as the number of half-cycles during which the current is applied.

In order to apply the welding current for two cycles and to prevent its being applied for two cycles, every other four of the slots 17 may be blanked out by means of an auxiliary or blanking disc 35 which, as is shown more clearly in Fig. 5 of the drawings, is provided with a notched periphery that is arranged to cover alternate groups of four of the slots 17. A plate 36, secured to the main disc 13 by means of screws 37, is arranged to hold the auxiliary disc 35 in position.

In order to obtain a different combination of current cycles as applied to the welding circuit, the auxiliary disc 38, shown in Fig. 6 of the drawings, may be provided. The disc 38 is arranged to cover four successive slots 17 and to leave open the next two slots 17. With this arrangement, alternating current will be applied to the welding circuit for one cycle and will not be applied for two cycles.

I have found that the auxiliary discs 35 and 38 may be formed of such material as paper, although, of course, other material such as aluminum, copper or the like may be used. By providing several auxiliary discs such as 35 and 38, it is possible to provide a relatively unskilled operator with means for accurately and readily obtaining a large combination of times of application of welding current with respect to the time during which it is not applied. It is only necessary for the operator to remove one set of the timing discs from the plate 11 and to position thereon the desired set which will provide the desired combination of time during which the welding current is applied and of time during which the welding current is not permitted to flow in the welding circuit. It is pointed out, however, that the accuracy of the timing does not depend on the accuracy of the auxiliary disc 35, but rather that it depends upon the main disc 13, which may be very accurately cut or milled.

Figures 7, 8:
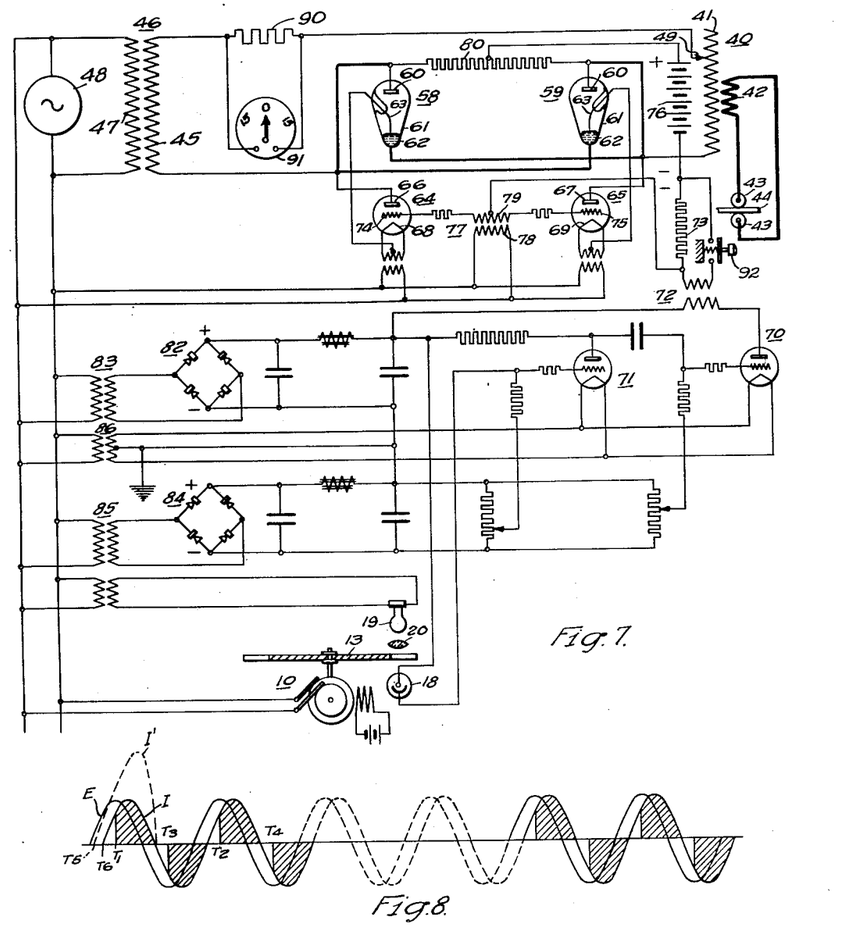
Fig. 7 illustrates diagrammatically the circuit connections which may be used in one embodiment of my invention.
Figs. 8 and 9 show a number of curves which demonstrate certain operating characteristics of the welding circuit.

The timing device described hereinbefore may be used for controlling the operation of the welding system shown in detail in the diagram in Fig. 7 of the drawings. Referring now particularly to Fig. 7 of the drawings, it will be observed that the reference character 40 designates, generally, a welding transformer having a primary winding 41 and a secondary winding 42. The secondary winding 42 may be connected to a welding circuit which, in this instance, comprises a pair of roller welding electrodes 43 between which work 44, on which a welding operation is to be performed, may be positioned. It will be understood, however, that the secondary winding 42 may be connected to other types of welding electrodes such as those used for spot welding, rather than the roller electrodes 43 which are customarily used for line welding. The primary winding 41 of the transformer 40 may be connected to the secondary winding 45 of a power transformer, shown generally at 46, the primary winding 47 of which may be connected to a suitable source of alternating current 48, such, for example, as a 60-cycle source.

In order to vary the current flow to the welding transformer 40, an adjustable tap 49 may be provided along the primary winding 41 of the welding transformer 40. However, as will be set forth in detail hereinafter, it is unnecessary to provide the adjustable tap 49 in the event that advantage is taken of certain adjustments which have been previously described for controlling the time of application of the light rays from the light source 19 to the photo-electric cell 18.

In order to control the application of alternating current to the welding transformer 40, vapor-electric devices, shown generally at 58 and 59 are provided. The devices 58 and 59 are of the mercury vapor type, in each of which an anode 60 is provided, as illustrated, in a suitable container 61, at the bottom of which is located a pool of mercury 62. The container 61 is evacuated and is then filled with mercury vapor. In order to render the vapor-electric devices 58 and 59 conducting, a starting electrode or crystal 63 is provided in each of them, which comprises a material such as boron, carborundum or the like.

While two individual vapor-electric devices 58 and 59 are illustrated, it will be readily understood that a single vapor-electric device having two mercury pools may be used, in which the mercury pools alternately function as anode and cathode. It has been found that, when a certain amount of current is caused to flow through the starting electrodes 63 into the mercury pools 62, cathode spots are formed which cause the mercury vapor within the containers 61 to become conducting, provided the proper polarities are applied to the anodes 60 and the mercury pools 62, which form the cathodes. Thus, it is only necessary to pass sufficient starting current through the starting electrodes 63 to form the cathode spots at a predetermined time in the proper half-cycle in the alternating-current wave to render the vapor-electric devices 58 and 59 conducting for the remainder of their particular half-cycles.

In order to conduct succeeding half-cycles of alternating-current, the vapor-electric devices 58 and 59 are connected inversely, that is, the anode 60 and the cathode 62 of the devices 58 and 59, respectively, are connected together while the cathode 62 and the anode 60 thereof are connected together, as illustrated in the drawings. It will, therefore, be evident that, if the vapor-electric devices 58 and 59 are rendered conducting by energizing the starting electrodes 63, current will continue to flow therethrough as long as this condition is maintained. However, if the starting electrodes 63 are not energized during a time interval corresponding to a time longer than the half-cycle during which either of the vapor-electric devices 58 or 59 is adapted to be conducting, neither of them will conduct a succeeding half-cycle. In other words, it is necessary to ignite the vapor in the devices 58 and 59 for each half-cycle for which they are adapted to be conducting and if they are not so ignited, then they will not conduct for periods longer than one-half cycle.

In order to render the vapor-electric devices 58 and 59 conducting, control tubes 64 and 65, of the hot cathode type, may be provided and their anodes 66 and 67 may be connected to the anodes of the vapor-electric devices 58 and 59, respectively, as shown. The cathodes 68 and 69 of the control tubes 64 and 65 are connected in the customary manner to the starting electrodes 63 of the vapor-electric devices 58 and 59, respectively. The control tubes 64 and 65 are arranged to pass sufficient current through the starting electrodes 63 so that the cathode spots will be formed, as set forth hereinbefore, to render the vapor-electric devices 58 and 59 conducting.

In order to initiate the functioning of the control tubes 64 and 65 a timer tube 70 is provided which is arranged to apply the output of the photo-electric cell 18, as amplified by an amplifier 71 through an insulating or impulse transformer 72 to a resistor 73. The control impulse thus obtained is of such a polarity as to overcome the negative potential which is normally applied to the grids 74 and 75 of the control tubes 64 and 65 by means of a direct-current source, such as a battery 76. The polarity of the control impulse is indicated by the customary polarity signs located at the ends of the resistor 73. The insulating or impulse transformer 72 also serves for the purpose of insulating the control circuit including the timer tube 70 and the amplifier 71 from the main or welding circuit in order that the former circuit may not be affected by different grounding conditions in the latter circuit.

In order to control both of the grids 74 and 75 of the control tubes 64 and 65 from a single control circuit, a transformer 77 is provided having a primary winding 78 connected to the source 48 of alternating-current and a secondary winding 79 connected to the grids 74 and 75, as illustrated. In addition, a resistor 80 is connected between the anodes 60 of the vapor electric devices 58 and 59. By means of the transformer 77 and the resistor 80, the potentials of the cathodes 68 and 69 of the control tubes 64 and 65 are reduced to a common point with respect to the control potentials which are applied thereto by means of the battery 76 or as obtained through the impulse transformer 72. It will be observed that the control potentials, as obtained from the battery 76 and the impulse transformer 72, are applied to the midpoints of the secondary winding 79 and the resistor 80. It is, therefore, unnecessary to provide a control circuit individual to each of the control tubes 64 and 65, although the anodes and cathodes of these tubes are oppositely connected.

It will be observed that the plate potentials for the timer tube 70 and the amplifier 71 may be obtained from a plate rectifier, shown generally at 82, of the copper-oxide type, which may be energized from a suitable plate transformer 83. In like manner, the grids of the timer tube 70, and the amplifier 71, may have the proper potential applied thereto by means of a grid rectifier shown generally at 84, which may also be of the copper-oxide type and it may be energized by means of a transformer shown generally at 85. A filament transformer, shown generally at 86, is provided for applying the proper heating current to the filaments of the timer tube 70 and amplifier 71. Since the operation and functioning of the timer tube 70, as controlled by the amplifier 71, are well known to those skilled in the art, a detailed description thereof will not be set forth in this specification.

It will be observed that the synchronous motor 10, which is employed for driving the main disc 13, is arranged to be energized from the source 48 of alternating current. These connections are desirable in order to synchronize the operation of the control system with the frequency of the source 48 of alternating-current so that the desired control of the flow of current to the welding circuit may be effected.

With a view to measuring the direct-current component of the alternating current which may exist in the welding circuit under certain conditions there is provided a meter 91, such as a direct-current milli-volt meter, connected across a resistance shunt 90 in the supply circuit. Since the direct current, resulting from certain transient conditions, may flow in either direction, the meter 91 is arranged to have a scale with a zero center. It will be apparent that the meter 91 may then be caused to indicate the presence of direct current, regardless of the direction of flow of such direct current.

A manually-operable control switch 92 is provided in the circuit connecting the impulse transformer 72 to the resistor 73 in order to permit the operator to control the functioning of the system as desired. It will be understood that the control switch 92 may be of any suitable type such as a push button switch or a foot-operated switch.

In operation, it will be assumed that the source 48 of alternating current is energized to apply a 60-cycle frequency to the power transformer 46. It will also be assumed that the synchronous motor 10 is operating to rotate the main disc 13 at a speed of one revolution per second, and for that, the disc combination, shown in Fig. 5 is provided. It will be further assumed that the proper energizing potentials are applied to the various elements of the control tubes 64 and 65, the timer tube 70 and the amplifier 71 and that the control switch 92 is closed.

Under the aforesaid conditions, current will be applied to the welding electrodes 43 for two cycles and it will not be applied for the next two succeeding cycles. This condition is illustrated by the curves shown in Fig. 8 of the drawings, the curve E representing the voltage of the welding circuit and the curve I representing the current. The phase displacement between these curves represents the power factor of the welding circuit which, as will be readily understood, will vary depending upon the material which is positioned between the welding electrodes 43. The full lines representing the curves E and I illustrate the time during which the vapor-electric devices 58 and 59 are ordinarily rendered conducting, while the dotted lines represent the time during which they are not ordinarily conducting.

As has been set forth hereinbefore, it is necessary in this embodiment of my invention to render the vapor-electric devices 58 and 59 conducting for each half-cycle. Thus, as the control electrode of the vapor-electric device 58 is energized, at a time corresponding to $T_1$, it will become conducting at that instant and will remain in this state until the end of this particular half-cycle. However, it is necessary to again apply the energizing potential to the control electrode 63 at a time $T_2$ in the next succeeding half-cycle for which the vapor-electric device 58 may be adapted to be conducting in order to cause current to flow therethrough. In like manner, it is necessary to energize the control electrode 63 of the vapor-electric device 59 at times $T_3$ and $T_4$ in order to render it conducting for its corresponding half-cycles. It will be understood that, at each instant when one of the slots 17 is positioned between the light source 19 and the photo-cell 18, times corresponding to $T_1$, $T_2$, $T_3$ and $T_4$ occur, at which instants the vapor-electric devices 58 and 59 are caused to be conducting.

In the event that the vapor-electric device 58, for instance, should be rendered conducting at a time corresponding to $T_5$, when normally the next instant, when it should be rendered conducting, would occur at or after the next zero point of the current wave I, a transient phenomenon will appear which, as will be readily understood, will be due to the magnetic condition of the transformers connected to the welding circuits. As a result, the current in the half cycle will not follow the curve I but will follow a curve which may be represented by the dotted line I' for one half-cycle which will represent a current of considerably greater magnitude than would ordinarily be present. This transient phenomenon causes a certain amount of direct current to flow in the circuit which may be indicated by the meter 91. These surges will be reflected in the source 48 of alternating current and will cause overloads to be applied thereto which are undesirable. Further, due to the application of a direct current component in the voltage applied to the primary winding 41 of the welding transformer 40 and to the secondary winding 45 of the power transformer 46, the magnetizing currents for the transformers will be increased, thereby increasing the amount of current required to be conducted by the vapor-electric devices 58 and 59 beyond that which they may be capable of conducting. It is, therefore, desirable to reduce this transient effect so that no direct current will flow in the circuit.

This correction may be obtained by causing the vapor-electric devices 58 and 59 to become conducting at a time at or after the next succeeding zero point of the current curve has been reached. Thus, if the vapor-electric device 58, for example, is rendered conducting at a time $T_6$ or at any time after this instant in the next succeeding half-cycle, this transient phenomenon will not occur. Since the time $T_6$ will vary, depending upon the power factor of the circuit, it is desirable to be able to adjust the position of the photo-electric cell 18 and the light source 19 for each different power factor. This adjustment may be made by loosening the thumb screw 31 which holds the scale 29 in position. The position of the photo-electric cell 18 and the light source 19 is then adjusted by means of the screws 26 and 27 until the meter 91 reads zero, thereby indicating that no direct current flows in the welding circuit. The scale 29 may then be adjusted so that the graduation corresponding to 100% is aligned with the arrow 32. The scale 29 may then be clamped by means of the thumb screw 31.

It will be understood that, after the adjustment, just described, has been made, the maximum heating condition will be available at the welding electrodes 43, since the vapor-electric devices 58 and 59 will be conducting for complete half-cycles. In the event that it is desired to reduce the heating below the maximum, it is merely necessary to adjust the position of the photo-electric cell 18 and the light source 19 by means of the screws 26 and 27 in the direction of rotation of the main disc 13, as indicated by the arrow thereon in Fig. 1, to a predetermined point along the graduations 33 as may be desired. Thus, instead of the vapor-electric device 58, for instance, being caused to become conducting at the time $T_5$, it may be caused to become conducting at the time $T_1$. It will be observed that the shaded area under the curve I, representing the current which is supplied to the welding electrodes 43, represents the total quantity of current which is applied. If this area is increased or decreased the average value of the current will be correspondingly increased or decreased, and, as a result the heating effect, as available at the welding electrodes 43, will be correspondingly altered. For the sake of clarity the current curve I, representing the conducting condition initiated at the time $T_1$ has been shown as being identical with the shape of the current wave resulting from initiating the conduction at the time $T_6$ while, in fact, it would be slightly different.

It will be apparent that it will not be necessary to provide the adjustable tap 49 on the primary winding 41 of the welding transformer 40 in order to vary the amount of current which is applied for performing the welding operation. This complication and expense may be obviated by the simple expedient of adjusting the times at which the vapor-electric devices 58 and 59 are arranged to become conducting in their corepsonding half-cycles and thereby changing the average value of the current which is provided for performing the welding operation.

Figure 9:
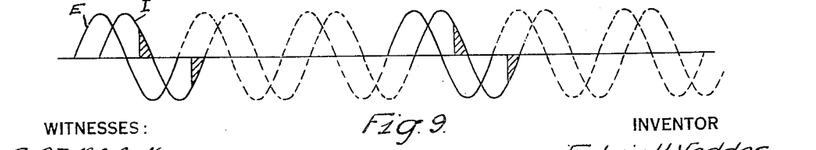

The curves illustrated in Fig. 9 of the drawings represent the voltage and current conditions in the welding circuit which ocur when the disc combination, shown in Fig. 6, is used. With this arrangement, current is applied for one cycle as indicated by the full-line curves and is not applied for two cycles, as illustrated by the dotted lines. It will be observed that the power factor of the welding circuit, as represented by the curves shown in Fig. 9, is considerably less than the power factor of the welding circuit as represented by the curves shown in Fig. 8. This change in the power factor, which may occur under different conditions, illustrates the necessity for providing an adjustment to compensate for changes in power factor.

The shaded area under the current curve I in Fig. 9 represents the amount of current which is applied for performing the welding operation. The particular current values illustrated may be obtained by adjusting the position of the photo-electric cell and the light source 19, as set forth hereinbefore, to obtain the relatively small current value as indicated.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

I claim as my invention:

1. An electric power system comprising, in combination, a source of alternating current, a load device, circuit means connecting the source of alternating current to the load device, a pair of inversely connected vapor-electric devices connected in said circuit means for conducting succeeding half-cycles of the alternating current to said load device as alternating current, a control electrode individual to each vapor-electric device, and means for energizing said control electrodes comprising a source of energizing potential, a light source, a photo-electric cell adapted, when illuminated by said light source, to effect the application of said energizing potential to said control electrodes for rendering said vapor-electric devices conducting, and light-intercepting means synchronized with said alternating current for interrupting the light applied to said photo-electric cell for rendering said vapor-electric devices conducting at predetermined instants in the half-waves of the alternating current during which said vapor-electric devices are adapted to be conducting.

2. An electric power system comprising, in combination, a source of alternating current, a load device, circuit means connecting the source of alternating current to the load device, a pair of inversely connected vapor-electric devices connected in said circuit means for conducting succeeding half-cycles of the alternating current to said load device as alternating current, a control electrode individual to each vapor-electric device, and means for energizing said control electrodes comprising a source of energizing potential, a light source, a photo-electric cell adapted, when illuminated by said light source, to effect the application of said energizing potential to said control electrodes for rendering said vapor-electric devices conducting, a rotatably-mounted disc having a plurality of spaced slots and teeth in the periphery thereof, said slots and teeth being positioned between said light source and photo-cell to interrupt the light applied to said photo-electric cell, and a synchronous motor connected to said source of alternating current and having driving connection with said disc for rotating it.

3. In a power system, a power circuit connected to supply alternating current to a load device, vapor-electric means connected in said circuit and adapted to conduct succeeding half-cycles of the alternating current to said load device as alternating current, control means for rendering said vapor-electric means conducting, and means for energizing said control means comprising a source of energizing potential, a light source, a photo-electric cell disposed to be illuminated by rays from said light source and to effect the application of said energizing potential to said control means, when illuminated, a rotatably-mounted disc having a plurality of spaced slots and teeth in the periphery thereof, said slots and teeth being positioned in the path of the rays from said light source impinging upon said photo-electric cell, and a synchronous motor connected to be energized by said alternating current for driving said disc.

4. In a power system, a power circuit connected to supply alternating current to a load device, vapor-electric means connected in said circuit and adapted to conduct succeeding half-cycles of the alternating current to said load device as alternating current, control means for rendering said vapor-electric means conducting, and means for energizing said control means comprising a source of energizing potential, a light source, a photo-electric cell disposed to be illuminated by rays from said light source and to effect the application of said energizing potential to said control means when illuminated, a rotatably-mounted disc having a plurality of spaced slots and teeth in the periphery thereof, said slots and teeth being positioned in the path of the rays from said light source impinging upon said photo-electric cell, means for covering a portion of said slots to maintain said vapor-electric means non-conducting for a predetermined time interval, and a synchronous motor connected to be energized by said alternating current for driving said disc.

5. In a power system, a power circuit connected to supply alternating current to a load device, vapor-electric means connected in said circuit and adapted to conduct succeeding half-cycles of the alternating current to said load device as alternating current, control means for rendering said vapor-electric means conducting, and means for energizing said control means comprising a source of energizing potential, a light source, a photo-electric cell disposed to be illuminated by rays from said light source and to effect the application of said energizing potential to said control means when illuminated, a rotatably-mounted disc having a plurality of spaced slots and teeth in the periphery thereof, said slots and teeth being positioned in the path of the rays from said light source impinging upon said photo-cell, a movable frame for carrying said light source and photo-electric cell, means for adjusting the position of said frame to cause the teeth of said disc to intercept said rays of light at different instants, a movable index adapted to be secured in a predetermined position when a predetermined condition exists in said welding circuit, said index being provided with graduations to which said frame may be adjusted to provide corresponding average current values in the welding circuit, and a synchronous motor connected to be energized by said alternating current for driving said disc.

6. An electric power system comprising, in combination, a source of alternating current, a load device, circuit means connecting the source of alternating current to the load device, a pair of inversely connected electric discharge devices connected in said circuit means for conducting successive half cycles of said alternating current to supply alternating current to said load device, photo-electric means connected to said discharge devices, and means for projecting pulsations of radiant energy in synchronism with said alternating current on said photo-electric means for initiating the conduction by said devices at times predeterminable at will.

7. An electric power system comprising, in combination, a source of alternating current, a load device, circuit means connecting the source of alternating current to the load device, a pair of inversely connected electric discharge devices connected in said circuit means for passing succeeding half-cycles of the alternating current to supply alternating current to said load device, photo-electric means connected to said discharge devices and means for projecting pulsations of radiant energy in synchronism with said alternating current on said photo-electric means to render said discharge devices conducting for a predetermined number of half cycles of the alternating current and at instants predeterminable at will in each of said half-cycles of alternating current.

8. In a power system, a power circuit connected to supply alternating current to a load device, and means for controlling the flow of alternating current to the load device comprising electric discharge means connected in the load circuit, photo-electric means connected to said electric discharge means and means for projecting pulsations of radiant energy on said photo-electric means in synchronism with said alternating current for initiating the operation thereof, at times which are in synchronism with the times at which said pulsations occur.

9. In a power system, a power circuit connected to supply alternating current to a load device, electric discharge means connected in said circuit for conducting said alternating current during succeeding half-cycle intervals to said load device as alternating current, and control means for successively rendering said electric discharge means conducting instants predeterminable at will in succeeding half-cycles for a predetermined number of half-cycles and non-conducting for a predetermined number of half-cycles.

10. In a power system, a power circuit connected to supply alternating current to a load device, electric discharge means connected in said circuit for conducting said alternating current during succeeding half-cycle intervals to said load device as alternating current, control means for successively rendering said electric discharge means conducting during a predetermined number of half cycles of the alternating current, means for causing said discharge means to be conducting at predetermined instants in succeeding half-cycles of the alternating current and means for adjusting the functioning of the last said means to vary the time of occurrence of said predetermined instant and thereby to vary the average value of the current flowing in said power circuit.

11. In a power system, a power circuit connected to supply alternating current to a load device, electric discharge means interposed in said circuit and adapted to conduct succeeding half-cycles of the alternating current to said load device as alternating current, control means connected to render said electric discharge means conducting, means for indicating that the electric discharge means is rendered conducting at the instant of the instantaneous minimum current value, and means for adjusting said control means to render said electric discharge means conducting at instants after said instant of the instantaneous minimum current value to vary the average value of the current flowing in said power circuit.

12. An electric power system comprising, in combination, a source of alternating current, a load device, circuit means connecting the source of alternating current to the load device, a pair of inversely connected electric discharge devices connected in said circuit means for conducting succeeding half-cycles of the alternating current to said load device as alternating current, a control electrode individual to each vapor-electric device, photo-electric means connected to energize said control electrodes, means for projecting radiant energy on said photo-electric means, and means for varying said radiant energy in synchronism with said alternating current to render said discharge devices conducting during succeeding half-cycles of said alternating current and at instants predeterminable at will in said succeeding half-cycles.

13. An electric power system comprising, in combination, a source of alternating current, a load device, circuit means connecting the source of alternating current to the load device, a pair of inversely connected electric discharge devices connected in said circuit means for conducting succeeding half-cycles of the alternating current to said load device as alternating current, a control electrode individual to each electric discharge device, a control tube individual to each control electrode, a grid in each control tube, circuit means for applying a blocking potential to said grids to render said control tubes non-conducting, photo-electric means connected to said grids, means for projecting radiant energy on said photo-electric means, and means for varying said radiant energy in synchronism with said alternating current to overcome said blocking potential during succeeding half-cycles of said alternating current and at predetermined instants in said succeeding half-cycles of the alternating current and to render said control tubes conducting at corresponding instants thereby energizing said control electrodes and rendering said electric discharge devices conducting.

14. An electric power system comprising, in combination, a source of alternating current, a load device, circuit means connecting the source of alternating current to the load device, a pair of inversely connected electric discharge devices connected in said circuit means for passing succeeding half-cycles of the alternating current to said load device as alternating current, and means for producing impulses in synchronism with said alternating current and connected to render said discharge devices conducting at instants predeterminable at will in each of the half-cycles of alternating current which said devices are adapted to conduct.

15. In a power system, an alternating-current power source, a power circuit connected to supply alternating current of the same frequency as said source from said source to a load device, and means for controlling the flow of said alternating current to the load device comprising electric discharge means connected in the power circuit, and means for producing impulses of steep wave front compared to the wave front of said alternating current in synchronism with said alternating current and for transmitting said impulses to said electric discharge means for initiating the operation thereof at times which are predeterminable at will.

16. An electric power system comprising, in combination, a source of alternating current, a load device, circuit means connecting the source of alternating current to the load device, a pair of inversely connected electric discharge devices connected in said circuit means for conducting succeeding half-cycles of the alternating current to said load device as alternating current, a control electrode individual to each discharge device, and means for producing impulses in synchronism with said alternating current and connected to energize said control electrodes to render said discharge devices conducting at instants which are predeterminable at will in succeeding half-cycles of the alternating current.

17. An electric power system for supplying a load comprising a source of alternating current, circuit means connecting the source to the load, means, connected in the circuit means, for conducting successive half-cycles of said alternating current to said load and means, including photo-electric means, and means for varying the radiation impinging on said photo-electric means in synchronism with said source, to control the operation of said means for conducting successive half-cycles.

18. An electric power system for supplying a load comprising, a source of alternating current, circuit means connecting the source to the load, vapor-electric means, connected in the circuit means, for conducting successive half-cycles of said alternating current to said load and means, including photo-electric means and means for varying the radiation impinging on said photo-electric means in synchronism with said source, to control the operation of said vapor-electric means.

19. An electric power system for supplying a load comprising, a source of alternating current, circuit means connecting the source to the load, means, connected in the circuit means, for conducting successive half-cycles of said alternating current to said load and means, including photo-electric means and means for varying the radiation impinging on said photo-electric means in synchronism with said source, to control the operation of said means for conducting successive half-cycles, said controlling means including means for selecting certain half-cycles of said source during which said means for conducting successive half-cycles is in operation and certain other half-cycles of said source during which said means for conducting successive half-cycles is inactive.

20. An electric power system for supplying a load comprising, a source of alternating current, circuit means connecting the source to the load, means, connected in the circuit means, for conducting successive half-cycles of said alternating current to said load and means, including photo-electric means and means for varying the radiation impinging on said photo-electric means in synchronism with said source, to control the operation of said means for conducting successive half-cycles, said controlling means including means for selecting certain half-cycles of said source during which said means for conducting successive half-cycles is in operation and certain other half-cycles of said source during which said means for conducting successive half-cycles is inactive, and means for varying the portion of each of said first-mentioned half-cycles during which said means for conducting successive half-cycles is in operation.

21. An electric power system for supplying a load comprising, a source of periodic current, circuit means connecting the source to the load, means connected in the circuit means, to be energized by an electrical pulsation, for conducting successive cycles of said periodic current and means for permitting the supply of separate energizing electrical pulsations to said conducting means during each one of a predetermined number of cycles of said source and for restraining the supply of said pulsations during a succeeding predetermined number of cycles.

22. An electric power system for supplying a load comprising, a source of periodic current, circuit means connecting the source to the load, means connected in the circuit means, to be energized by an electrical pulsation, for conducting successive cycles of said periodic current, means for permitting the supply of separate energizing electrical pulsations to said conducting means during each one of a predetermined number of cycles of said source and for restraining the supply of said pulsations during a succeeding predetermined number of cycles, and means for shifting at will the relative point in the cycles at which the supply of said electrical pulsations is initiated.

23. An electric power system comprising, in combination, a source of alternating current, a load device, circuit means connecting the source of alternating current to the load device, a pair of inversely connected electric-discharge devices connected in said circuit means for controlling the flow of alternating current to said load device, and impulsing means for providing potential impulses of wave front substantially steeper than the wave front of said alternating current, said potential impulses being synchronized with said alternating current and transmitted to said discharge devices for initiating the operation thereof at predetermined times.

24. Synchronizing apparatus comprising a source of periodic current, a contrivance having elements disposed thereon in a manner corresponding to the periodicity of the source, means for moving said elements in synchronism with said source and selective means, mounted on said contrivance and cooperative with said elements, for causing said source to supply power of one magnitude during certain of its periods and of another magnitude during certain other of its periods.

25. Synchronizing apparatus comprising a source of periodic current, means, capable of being motivated and having a surface provided with a plurality of similar elements uniformly spaced thereon, means for moving the last said means in synchronism with said source, said elements on said surface being so related to the periodicity of said source and the speed at which said moving means is moved being such that the frequency with which said elements pass a predetermined point corresponds to the frequency of said source, and selective means mounted on said surface and cooperative with said elements for causing said source to supply power of one magnitude during certain of its periods and of another magnitude during certain others of its periods.

26. Apparatus for synchronously supplying a load from a source of periodically pulsating current comprising, means for producing pulses of electrical energy in synchronism with said source and at a frequency corresponding to the frequency of said source, valve means interposed between said source and said load for normally blocking the passage of current between said source and said load, means for so coupling said valve means to said pulse producing means that said valve means is influenced by a pulse of electrical energy and when so influenced operates to permit the passage of current between said source and said load only until the end of the pulsation during which said pulse was impressed, and means for suppressing certain of said pulses to select certain pulsations of said source for transmission through said load and to reject certain others.

27. Apparatus according to claim 26, characterized by the fact that the frequency of the pulses produced is equal to the frequency of the pulsations of the source.

28. Apparatus according to claim 26 characterized by the fact that the valve means comprises at least one electric discharge path having means for controlling the discharge therethrough, and the energizing pulse of electrical energy is impressed on the controlling means.

29. Apparatus for synchronously supplying a load from a source of alternating current comprising, means for producing pulses of electrical energy in synchronism with said source and at a frequency corresponding to the frequency of said source, valve means comprising in effect two electric discharge paths connected in anti-parallel between said source and said load for normally blocking the passage of current between said source and said load and when energized adapted to conduct alternate half-cycles of said source, means for so coupling said pulse producing means to said valve means that said valve means is influenced by said pulses of electrical energy and when so influenced operates to permit the passage of current between said source and said load only until the end of the half-cycle of said source during which said pulse was impressed, and means for suppressing certain of said pulses to select certain half-cycles of said source for transmission through said load and to reject certain others.

30. Apparatus according to claim 26 characterized by suppressing means of such structure that the transmission of current through the load is periodic.

31. Apparatus for synchronously supplying current from a source of periodic current pulsations to a load comprising, valve means between said source and said load for normally restraining the passage of current through said load, a plurality of elements of simple geometric structure arranged uniformly on the circumference of a circle, means coacting with said elements when they are in a predetermined region for producing pulses of electrical energy to render said valve means conductive whereby the passage of current to said load is permitted and a synchronous motor connected to said source for rotating said elements in such manner that said elements pass into said region with a periodicity that is proportional to the periodicity of said pulsations, said coacting means including means so contrived that said pulses are produced only when certain of said elements pass through said region.

32. A device for causing current flow in an electric circuit to follow a predeterminable program of periodic variation which comprises a source of alternating current-voltage, a circuit element adapted to interpose a high impedance to resumption of current flow immediately after the current wave has fallen to zero in course of the periods of said source, a series of elements adapted by progressive movement to vary a beam of radiant energy, means to vary said impedance in accordance with said variations in said beam, means for moving said elements at such a rate that the last-mentioned variations synchronize with the periodicity of said alternating-current source, and readily removable means for adjusting at will the effectiveness in varying said beam of desired members of said series of elements.

33. The method of causing current flow in an electric circuit to follow a predeterminable program of periodic variation which comprises supplying current to said circuit from a source of alternating-current voltage, through a circuit element adapted to interpose a high impedance to resumption of current flow immediately after the current wave has fallen to zero in course of the periods of said source, moving a series of elements adapted by progressive movement to vary a beam of radiant energy at such a rate that the last-mentioned variations synchronize with the periodicity of said alternating-current source, and varying said high impedance in accordance with the variations in said path, one and only one variation in said high impedance taking place for each variation of said path.

34. Apparatus for supplying power from an alternating source to a load comprising in effect a pair of discharge paths connected in antiparallel between said source and said load, and control means operating to render each of said paths in its turn conductive at any predetermined instant in the half periods of said source.

35. Apparatus for supplying power from an alternating source to a load comprising in effect a pair of discharge paths connected in anti-parallel between said source and said load and control means operating to render said paths conducting during a predetermined number of half periods of said source, said control means including means for preventing each of said discharge paths from becoming conductive in any one of said half periods prior to a predetermined instant in said half period.

36. An electric power system comprising, in combination, a load circuit, circuit means connecting the load circuit to a source of alternating current, electric valve means connected to control the flow of current in said load circuit, means for rendering said valve means conducting during periods comprising a predetermined number of half cycles of the alternating current, said valve means being non-conducting during the intervening periods and means for rendering said valve means conducting at a predetermined time in any of said half cycles of the alternating current.

37. An electric power system comprising, in combination, a load circuit, circuit means for connecting the load circuit to a source of alternating current, a pair of inversely connected electric valve devices connected to control the flow of current in said load circuit, a control electrode individual to each electric valve device, control means disposed to effect the energization of said control electrodes during a predetermined number of half cycles of the alternating current, and additional control means disposed to prevent the energization of said control electrodes until the occurrence of a predetermined time in any of said half cycles of the alternating current thereby rendering said valve devices conducting during a predetermined number of half cycles beginning at a predetermined time in each half cycle.

38. In a power system, a power circuit connected to supply alternating current to a load device, and means for controlling the flow of alternating current to the load device comprising electric discharge means connected in the power circuit, and means for producing pulsations in synchronism with said alternating current and connected to said electric discharge means for initiating the operation thereof at times in the half cycles of said source which are predeterminable at will.

39. In a power system, an alternating current power source, a power circuit connected to supply alternating current of the same frequency as that of said source from said source to a load device and means for controlling the flow of said alternating current to the load device comprising electric discharge means connected in the power circuit, and means for producing impulses of short duration compared to the duration of a half period of said alternating current in synchronism with said alternating current and for transmitting said impulses to said electric discharge means for initiating the operation thereof at times which are predeterminable at will.

40. In a power system, a power circuit connected to supply alternating current to a load device, electric discharge means interposed in said circuit and adapted to conduct succeeding half-cycles of the alternating current to said load device as alternating current, control means connected to supply an impulse during each said succeeding half cycle to render said electric discharge means conducting, and means for adjusting said control means to supply each said impulse to render said electric discharge means conducting, at the earliest, at the instant at which the instantaneous minimum current value occurs to vary the average value of the current flowing in said power circuit.

41. In a power system, a power circuit connected to supply alternating current to a load device, electric discharge means interposed in said circuit and adapted to conduct succeeding half-cycles of the alternating current to said load device as alternating current, control means connected to supply an impulse during each said succeeding half cycle to render said electric discharge means conducting, and means for adjusting said control means to supply each said impulse to render said electric discharge means conducting, at the earliest, at the point in the half-cycles of the alternating current at which current through said load device, if supplied continuously under the action of the alternating source, would pass through zero, to vary the average value of the current flowing in said power circuit.

EDWIN H. VEDDER.